(12) United States Patent
Chin et al.

(10) Patent No.: US 8,203,992 B2
(45) Date of Patent: Jun. 19, 2012

(54) METHODS AND SYSTEMS FOR IMPLEMENTING CDMA-BASED DEDICATED CONTROL CHANNELS IN AN OFDMA-BASED NETWORK

(75) Inventors: Tom Chin, San Diego, CA (US); Kuo-Chun Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 885 days.

(21) Appl. No.: 12/211,867

(22) Filed: Sep. 17, 2008

(65) Prior Publication Data

US 2010/0067494 A1 Mar. 18, 2010

(51) Int. Cl.
*H04B 7/216* (2006.01)
(52) U.S. Cl. .......... 370/320; 375/144; 375/148
(58) Field of Classification Search .......... 370/320, 370/335, 344, 467; 375/144, 148
See application file for complete search history.

(56) References Cited

U.S. PATENT DOCUMENTS

| | | | | |
|---|---|---|---|---|
| 7,130,353 | B2 * | 10/2006 | Brunel | 375/261 |
| 7,177,297 | B2 * | 2/2007 | Agrawal et al. | 370/342 |
| 7,428,261 | B2 * | 9/2008 | Mills et al. | 375/148 |
| 7,873,055 | B2 * | 1/2011 | Li et al. | 370/395.4 |
| 2004/0228267 | A1 * | 11/2004 | Agrawal et al. | 370/203 |
| 2005/0030931 | A1 * | 2/2005 | Sung et al. | 370/342 |
| 2005/0276238 | A1 * | 12/2005 | Dabak et al. | 370/312 |
| 2008/0267157 | A1 * | 10/2008 | Lee et al. | 370/342 |

FOREIGN PATENT DOCUMENTS

| | | |
|---|---|---|
| WO | WO2007146930 | 12/2007 |
| WO | WO2008095042 | 8/2008 |

OTHER PUBLICATIONS

International Preliminary Report on Patentability—PCT/US2009/056424, The International Bureau of WIPO—Geneva, Switzerland, Jan. 19, 2011.
International Search Report & Written Opinion—PCT/US2009/056424, International Search Authority—European Patent Office—Jan. 11, 2010.
Lee, Howon et al.: "Reliable Multicast Services Using CDMA Codes in IEEE 802.16 OFDMA System," IEEE 61st Vehicular Technology Conference, 2005. IEEE, Piscataway, NJ, USA, vol. 4, (May 30, 2005), pp. 2349-2353, XP010855858; ISBN: 978-0-7803-8887-1 abstract p. 2349-p. 2350.

* cited by examiner

*Primary Examiner* — Phuc Tran
(74) *Attorney, Agent, or Firm* — Paul Kuo; Tyler Overall

(57) ABSTRACT

A method for efficiently transmitting control information may include allocating a portion of orthogonal frequency division multiple access (OFDMA) frames for transmission of a code division multiple access (CDMA) based signal. The CDMA-based signal may include data from one or more dedicated control channels. The method may also include converting the CDMA-based signal into a format that is suitable for transmission via OFDMA techniques. The method may also include transmitting the converted CDMA-based signal using a subset of available OFDMA subcarriers.

32 Claims, 9 Drawing Sheets

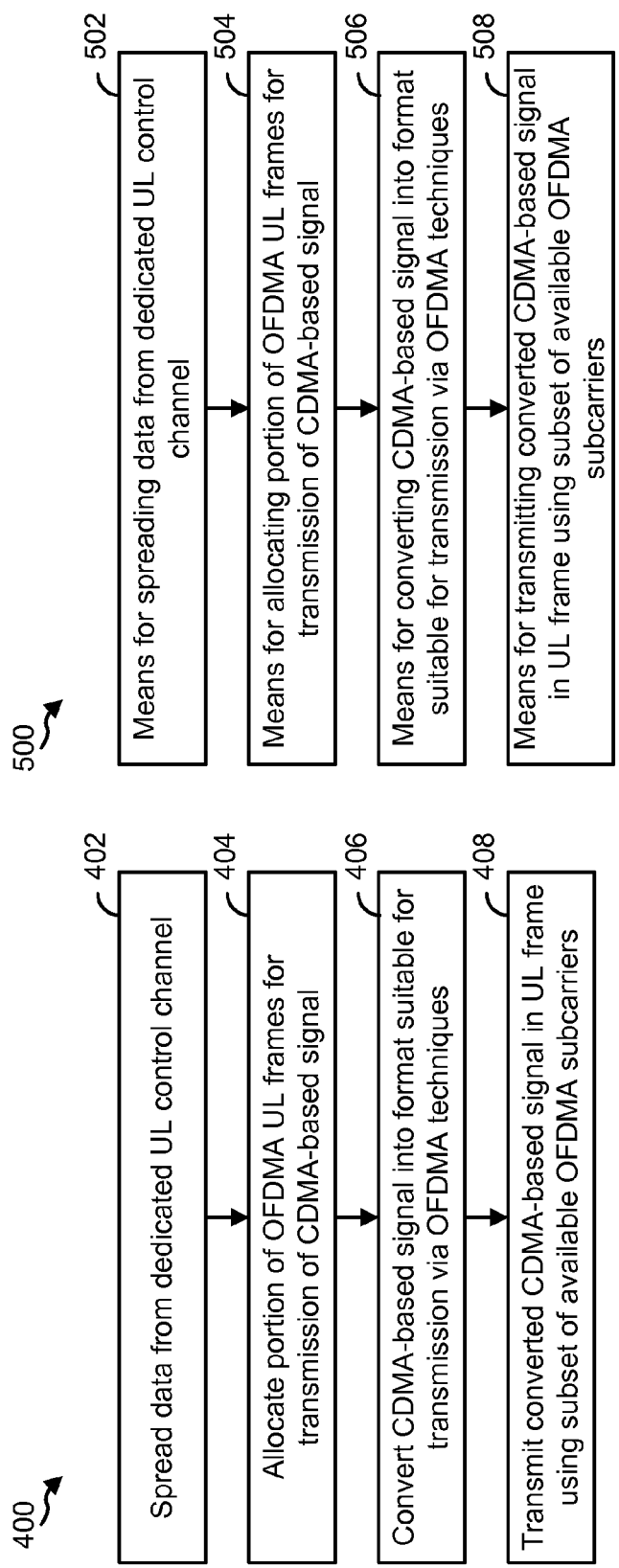

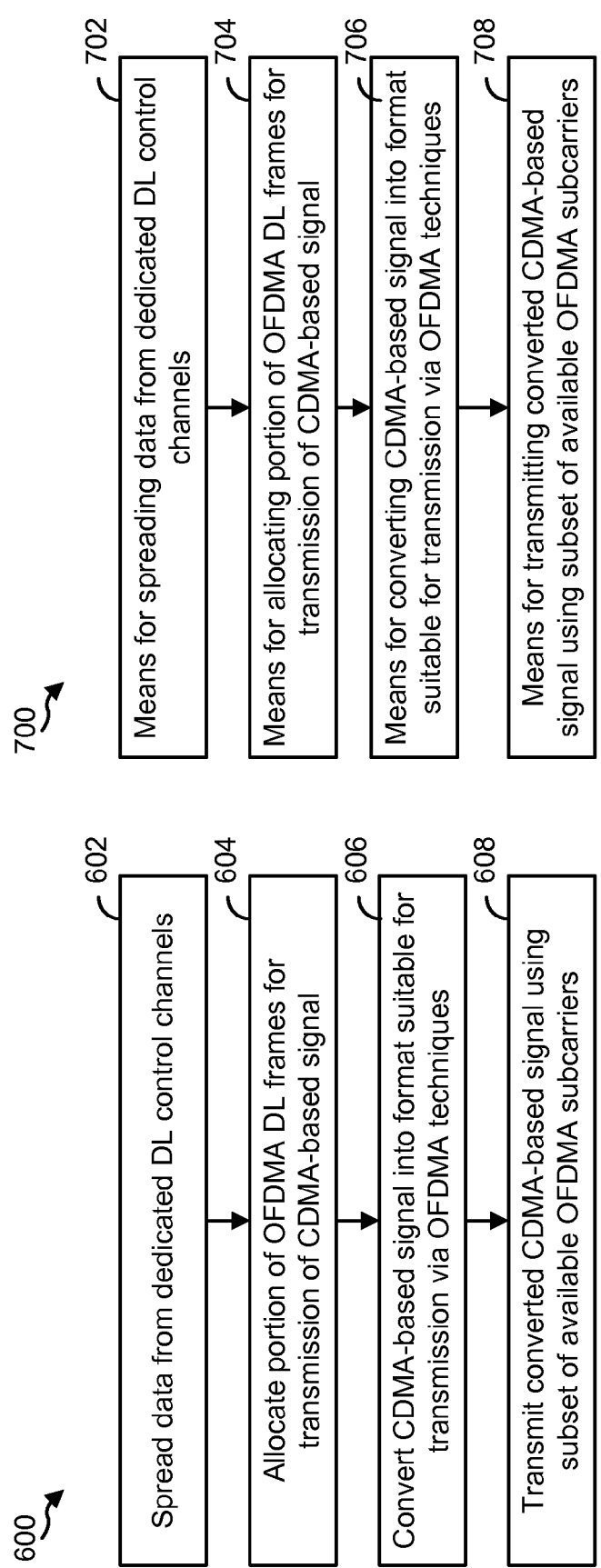

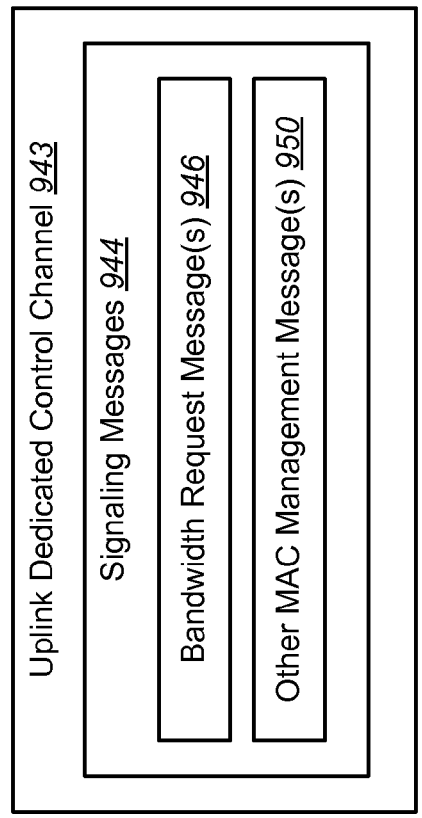
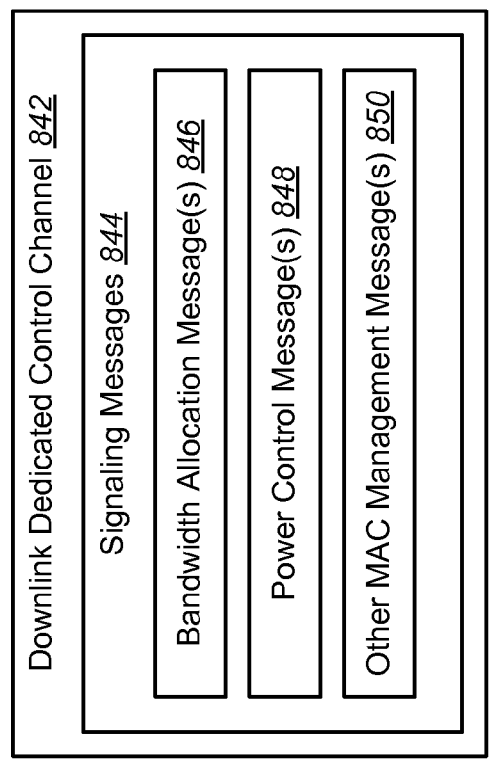
FIG. 9
FIG. 8

METHODS AND SYSTEMS FOR IMPLEMENTING CDMA-BASED DEDICATED CONTROL CHANNELS IN AN OFDMA-BASED NETWORK

TECHNICAL FIELD

The present disclosure relates generally to communication systems. More specifically, the present disclosure relates to methods and apparatus for implementing CDMA-based dedicated control channels in an OFDMA-based wireless communication network.

BACKGROUND

As used herein, the term "mobile station" refers to an electronic device that may be used for voice and/or data communication over a wireless communication network. Examples of mobile stations include cellular phones, personal digital assistants (PDAs), handheld devices, wireless modems, laptop computers, personal computers, etc. A mobile station may alternatively be referred to as an access terminal, a mobile terminal, a subscriber station, a remote station, a user terminal, a terminal, a subscriber unit, user equipment, etc.

A wireless communication network may provide communication for a number of mobile stations, each of which may be serviced by a base station. A base station may alternatively be referred to as an access point, a Node B, or some other terminology.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station.

The resources of a wireless communication network (e.g., bandwidth and transmit power) may be shared among multiple mobile stations. A variety of multiple access techniques are known, including code division multiple access (CDMA), time division multiple access (TDMA), frequency division multiple access (FDMA), and orthogonal frequency division multiple access (OFDMA).

Benefits may be realized by improved methods and apparatus related to the operation of wireless communication networks.

BRIEF DESCRIPTION OF THE DRAWINGS

FIG. 4 illustrates an example of a method for efficiently transmitting control information in accordance with the present disclosure;

FIG. 5 illustrates means-plus-function blocks corresponding to the method of FIG. 4;

FIG. 6 illustrates another example of a method for efficiently transmitting control information in accordance with the present disclosure;

FIG. 7 illustrates means-plus-function blocks corresponding to the method of FIG. 6;

FIG. 8 illustrates examples of signaling messages that may be transmitted over a downlink dedicated control channel;

FIG. 9 illustrates examples of signaling messages that may be transmitted over an uplink dedicated control channel;

SUMMARY

Figure 1:
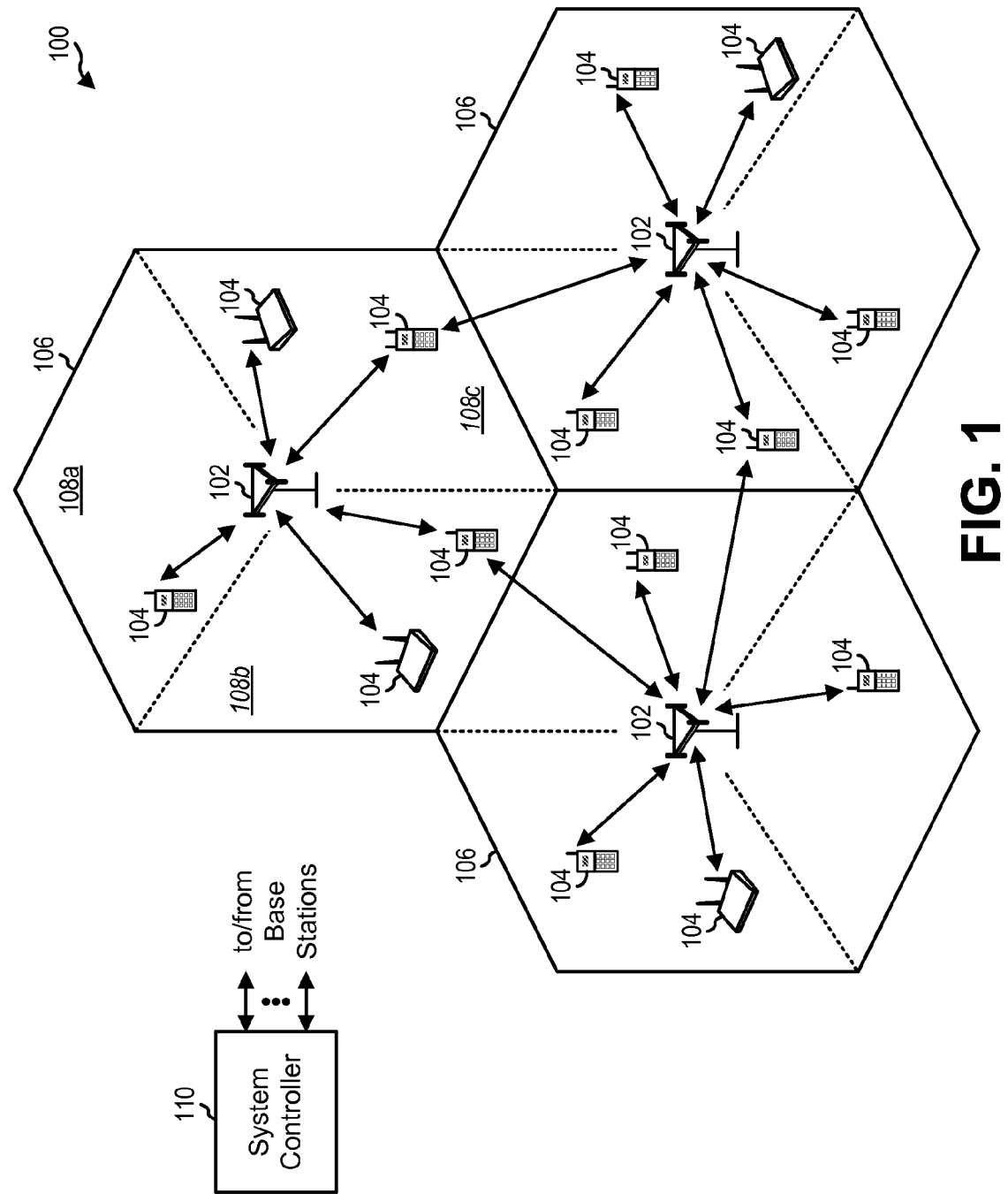
FIG. 1 illustrates a wireless communication system with multiple base stations and multiple mobile stations.

A method for efficiently transmitting control information is disclosed. The method may be implemented by a mobile station The method may include allocating a portion of orthogonal frequency division multiple access (OFDMA) uplink frames for transmission of a code division multiple access (CDMA) based signal. The CDMA-based signal may include data from an uplink dedicated control channel that is assigned to the mobile station. The method may also include converting the CDMA-based signal into a format that is suitable for transmission via OFDMA techniques. The method may also include transmitting the converted CDMA-based signal to a base station using a subset of available OFDMA subcarriers.

A method for efficiently transmitting control information is disclosed. The method may be implemented by a base station. The method may include allocating a portion of orthogonal frequency division multiple access (OFDMA) downlink frames for transmission of a code division multiple access (CDMA) based signal. The CDMA-based signal may include data from downlink dedicated control channels that are assigned to various mobile stations. The method may also include converting the CDMA-based signal into a format that is suitable for transmission via OFDMA techniques. The method may also include transmitting the converted CDMA-based signal to the various mobile stations using a subset of available OFDMA subcarriers.

A mobile station for efficiently transmitting control information is disclosed. The mobile station may include a processor. The mobile station may also include memory in electronic communication with the processor. The mobile station may further include instructions stored in the memory. The instructions may be executable by the processor to allocate a portion of orthogonal frequency division multiple access (OFDMA) uplink frames for transmission of a code division multiple access (CDMA) based signal. The CDMA-based signal may include data from an uplink dedicated control channel that is assigned to the mobile station. The instructions may also be executable to convert the CDMA-based signal into a format that is suitable for transmission via OFDMA techniques. The instructions may also be executable to transmit the converted CDMA-based signal to a base station using a subset of available OFDMA subcarriers.

A base station for efficiently transmitting control information is disclosed. The base station may include a processor. The base station may also include memory in electronic communication with the processor. The base station may also include instructions stored in the memory. The instructions may be executable by the processor to allocate a portion of orthogonal frequency division multiple access (OFDMA) downlink frames for transmission of a code division multiple access (CDMA) based signal. The CDMA-based signal may include data from downlink dedicated control channels that are assigned to various mobile stations. The instructions may also be executable to convert the CDMA-based signal into a format that is suitable for transmission via OFDMA techniques. The instructions may further be executable to transmit the converted CDMA-based signal to the various mobile stations using a subset of available OFDMA subcarriers.

A mobile station for efficiently transmitting control information is disclosed. The mobile station may include means for allocating a portion of orthogonal frequency division multiple access (OFDMA) uplink frames for transmission of a code division multiple access (CDMA) based signal. The CDMA-based signal may include data from an uplink dedicated control channel that is assigned to the mobile station. The mobile station may also include means for converting the CDMA-based signal into a format that is suitable for transmission via OFDMA techniques. The mobile station may also include means for transmitting the converted CDMA-based signal to a base station using a subset of available OFDMA subcarriers.

A base station for efficiently transmitting control information is disclosed. The base station may include means for allocating a portion of orthogonal frequency division multiple access (OFDMA) downlink frames for transmission of a code division multiple access (CDMA) based signal. The CDMA-based signal may include data from downlink dedicated control channels that are assigned to various mobile stations. The base station may also include means for converting the CDMA-based signal into a format that is suitable for transmission via OFDMA techniques. The base station may also include means for transmitting the converted CDMA-based signal to the various mobile stations using a subset of available OFDMA subcarriers.

A computer-program product for efficiently transmitting control information is disclosed. The computer-program product may include a computer-readable medium having instructions thereon. The instructions may include code for allocating a portion of orthogonal frequency division multiple access (OFDMA) uplink frames for transmission of a code division multiple access (CDMA) based signal. The CDMA-based signal may include data from an uplink dedicated control channel that is assigned to the mobile station. The instructions may also include code for converting the CDMA-based signal into a format that is suitable for transmission via OFDMA techniques. The instructions may also include code for transmitting the converted CDMA-based signal to a base station using a subset of available OFDMA subcarriers.

A computer-program product for efficiently transmitting control information is disclosed. The computer-program product may include code for allocating a portion of orthogonal frequency division multiple access (OFDMA) downlink frames for transmission of a code division multiple access (CDMA) based signal. The CDMA-based signal may include data from downlink dedicated control channels that are assigned to various mobile stations. The instructions may also include code for converting the CDMA-based signal into a format that is suitable for transmission via OFDMA techniques. The instructions may also include code for transmitting the converted CDMA-based signal to the various mobile stations using a subset of available OFDMA subcarriers.

DETAILED DESCRIPTION

The methods and apparatus of the present disclosure may be utilized in a broadband wireless communication network. The term "broadband wireless" refers to technology that provides wireless, voice, Internet, and/or data network access over a given area.

The Institute of Electronic and Electrical Engineers (IEEE) 802.16 Working Group on Broadband Wireless Access Standards aims to prepare formal specifications for the global deployment of broadband Wireless Metropolitan Area Networks. Although the 802.16 family of standards is officially called WirelessMAN, it has been called "WiMAX" (which stands for the "Worldwide Interoperability for Microwave Access") by an industry group called the WiMAX Forum. Thus, the term "WiMAX" refers to a standards-based broadband wireless technology that provides high-throughput broadband connections over long distances.

Some of the examples described herein are relevant to wireless communication networks that are configured in accordance with WiMAX standards. However, these examples should not be interpreted as limiting the scope of the present disclosure.

WiMAX is based on OFDM (orthogonal frequency division multiplexing) and OFDMA (orthogonal frequency division multiple access) technology. OFDM is a digital multi-carrier modulation technique that has recently found wide adoption in a variety of high-data-rate communication networks. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

FIG. 1 shows a wireless communication system 100 with multiple base stations (BS) 102 and multiple mobile stations (MS) 104. A base station 102 is a station that communicates with the mobile stations 104. A base station 102 may also be called, and may contain some or all of the functionality of, an access point, a Node B, an evolved Node B, etc. Each base station 102 provides communication coverage for a particular geographic area 106. The term "cell" can refer to a base station 102 and/or its coverage area 106 depending on the context in which the term is used. To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Mobile stations 104 are typically dispersed throughout the system 100. A mobile station 104 may also be called, and may contain some or all of the functionality of, a terminal, an access terminal, a user equipment, a subscriber unit, a station, etc. A mobile station 104 may be a cellular phone, a personal digital assistant (PDA), a wireless device, a wireless modem, a handheld device, a laptop computer, etc. A mobile station 104 may communicate with zero, one, or multiple base stations 104 on the downlink (DL) and/or uplink (UL) at any given moment. The downlink (or forward link) refers to the communication link from the base stations 102 to the mobile stations 104, and the uplink (or reverse link) refers to the communication link from the mobile stations 104 to the base stations 102.

For a centralized architecture, a system controller 110 may couple to base stations 102 and provide coordination and control for these base stations 102. The system controller 110 may be a single network entity or a collection of network entities. For a distributed architecture, base stations 102 may communicate with one another as needed.

Figure 2:
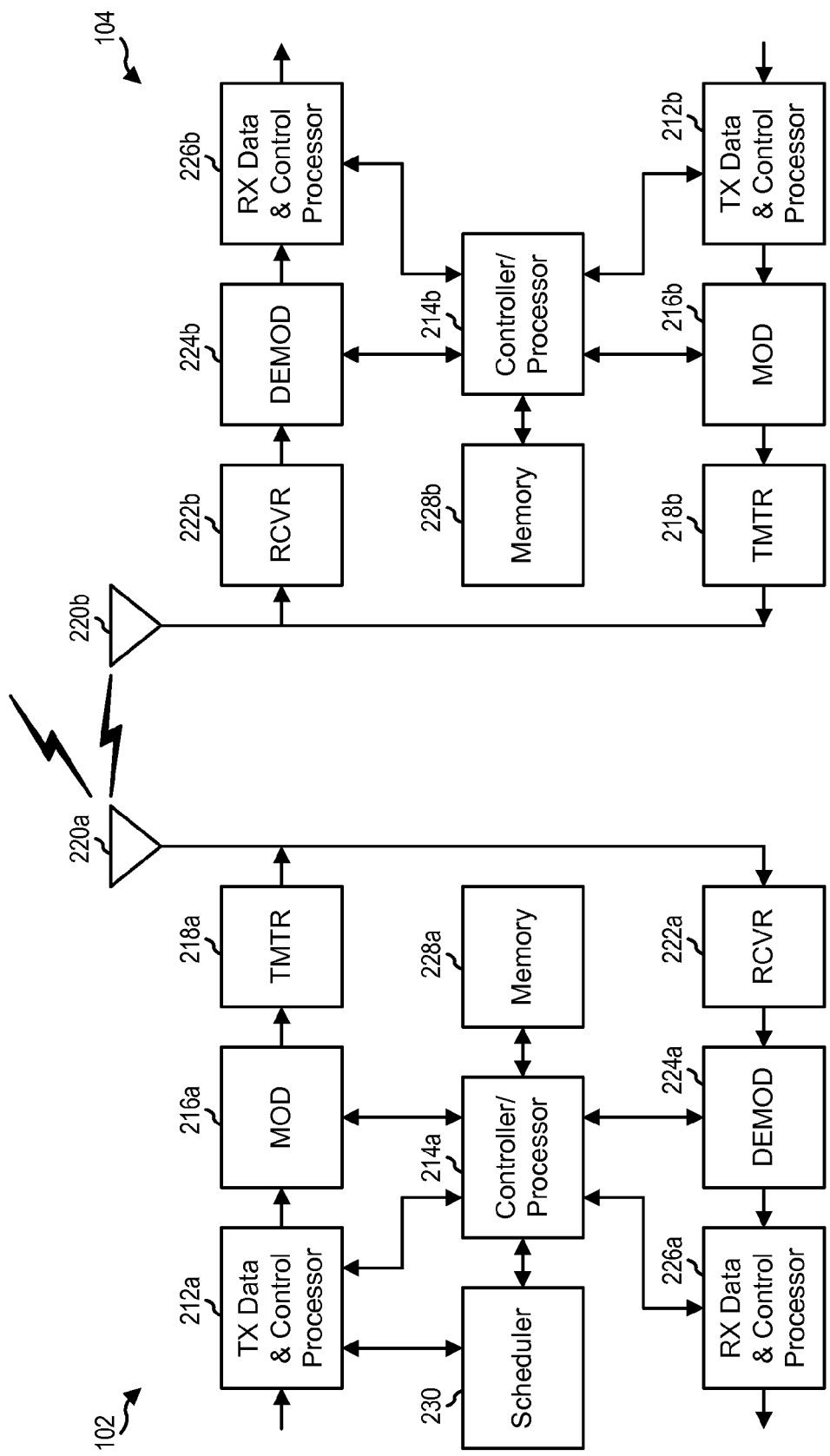
FIG. 2 illustrates a block diagram of a design of a base station and a mobile station.

FIG. 2 shows a block diagram of a design of a base station 102 and a mobile station 104, which may be one of the base stations 102 and one of the mobile stations 104 in FIG. 1. At the base station 102, a transmit (TX) data and control processor 212a may receive traffic data from a data source (not shown) and/or control information from a controller/processor 214a. The processor 212a may process (e.g., format, encode, interleave, and symbol map) the traffic data and control information and provide modulation symbols. A modulator (MOD) 216a may process the modulation symbols (e.g., for OFDM) and provide output chips. A transmitter (TMTR) 218a may process (e.g., convert to analog, amplify, filter, and upconvert) the output chips and generate a downlink signal, which may be transmitted via an antenna 220a.

At the mobile station 104, an antenna 220b may receive the downlink signals from the base station 102 and other base stations 102 and may provide a received signal to a receiver (RCVR) 222b. The receiver 222b may condition (e.g., filter, amplify, downconvert, and digitize) the received signal and provide received samples. A demodulator (DEMOD) 224b may process the received samples (e.g., for OFDM) and provide demodulated symbols. A receive (RX) data and control processor 226b may process (e.g., symbol demap, deinterleave, and decode) the demodulated symbols to obtain decoded data and control information for the mobile station 104.

On the uplink, at the mobile station 104, data and control information to be sent by the mobile station 104 may be processed by a TX data and control processor 212b, modulated by a modulator 216b, conditioned by a transmitter 218b, and transmitted via an antenna 220b. At the base station 102, the uplink signals from the mobile station 104 and possibly other mobile stations 104 may be received by an antenna 220a, conditioned by a receiver 222a, demodulated by a demodulator 224a, and processed by an RX data and control processor 226a to recover the data and control information sent by the mobile station 104. In general, the processing for uplink transmission may be similar to or different from the processing for downlink transmission.

Controllers/processors 214a and 214b may direct the operation at the base station 102 and the mobile station 104, respectively. Memories 228a and 228b may store data and program codes for the base station 102 and the mobile station 104, respectively. A scheduler 230 may schedule mobile stations 104 for downlink and/or uplink transmission and may provide assignments of system resources.

The present disclosure relates to CDMA-based dedicated control channels in an OFDMA-based wireless communication network, such as a network that is configured in accordance with mobile WiMAX standards.

One disadvantage of current WiMAX systems is the low Voice over IP (VoIP) capacity. The low VoIP capacity is at least partially due to the fact that the bandwidth request and the bandwidth grant signaling messages are transmitted using the downlink MAP (DL-MAP) and the uplink MAP (UL-MAP) messages. However, the DL-MAP and the UL-MAP messages are cell broadcast messages that are encoded in the very conservative modulation coding scheme (MCS) in order for the messages to be successfully decoded by mobile station (s) that are located at the cell boundary.

Another disadvantage of current WiMAX systems is that a mobile station may need to transmit the uplink (UL) bandwidth request message on the ranging channel before the mobile station can send the actual signaling message. When the base station (BS) receives the bandwidth request, it allocates the dedicated bandwidth using the UL-MAP, after which the mobile station can send the uplink signaling messages. This approach involves sending quite a few messages, which may cause an undesirable amount of delay, and which may even be unreliable under some circumstances.

In order to mitigate the above disadvantages, the present disclosure proposes to use CDMA-based dedicated control channels for individual mobile stations to facilitate transmission of signaling messages. Each dedicated control channel can be independently power controlled so that the power consumption and capacity may be improved over current WiMAX systems.

The present disclosure proposes CDMA-based dedicated control channels that use pseudo-noise (PN) code channels on the uplink and Walsh code channels on the downlink to coexist with the WiMAX OFDMA frame.

Figure 3:
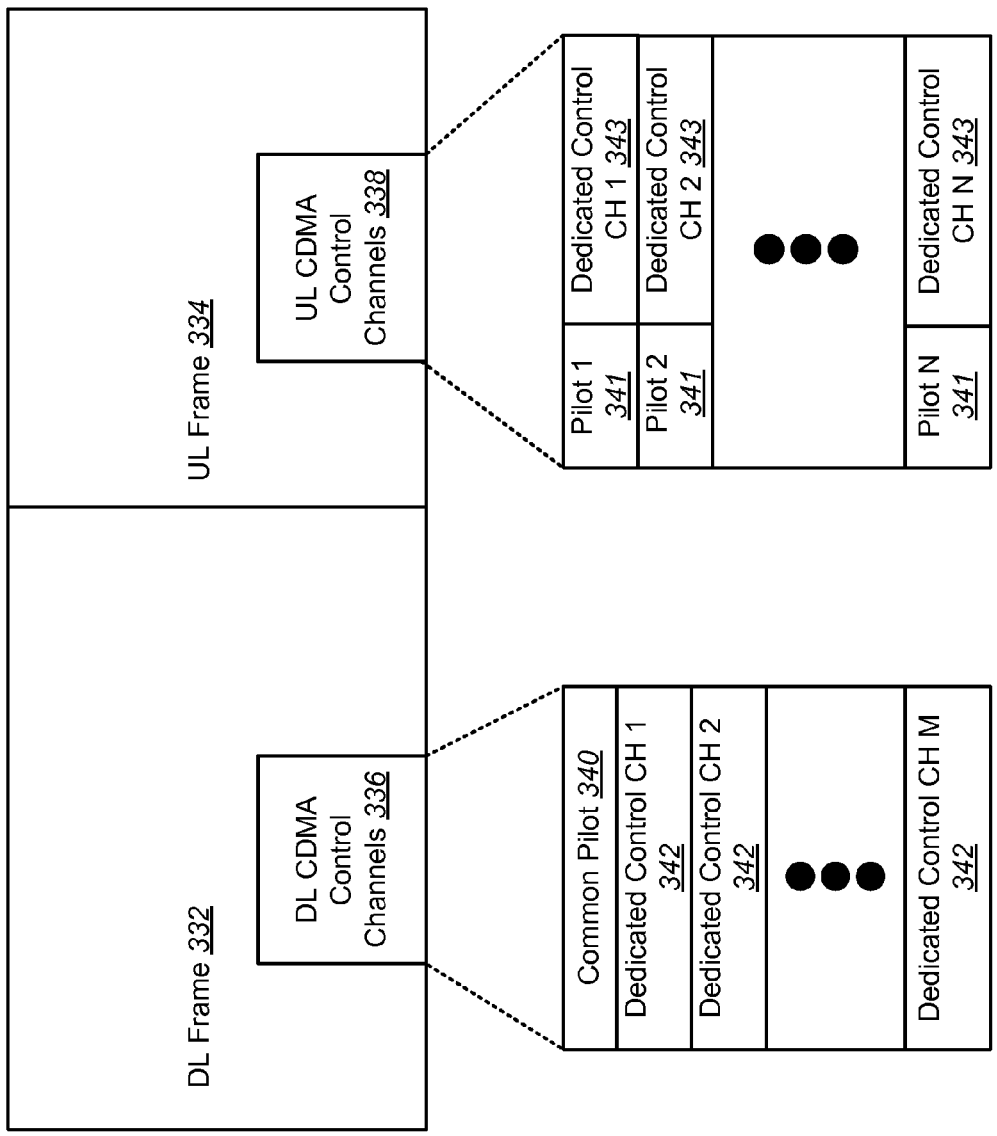
FIG. 3 illustrates an example of a WiMAX OFDMA frame architecture that supports the use of CDMA-based dedicated control channels.

Reference is now made to FIG. 3. FIG. 3 illustrates an example of a WiMAX OFDMA frame architecture that supports the use of CDMA-based dedicated control channels. Some portion of the bandwidth and symbol time of both the downlink frame 332 and the uplink frame 334 is allocated for the transmission of CDMA control channels 336, 338.

Within the downlink frame 332, the CDMA control channels 336 may begin with a common pilot channel 340 for synchronization, followed by individual dedicated control channels 342. Each control channel 336 may be spread using a Walsh code to achieve orthogonality in transmission.

Within the uplink frame 334, each control channel 338 may start with a pilot channel 341, and the pilot channel 341 may be followed by a dedicated control channel 343. Each control channel 338 may be spread using a PN code to minimize the interference with other control channels 338.

Each mobile station can be allocated with a downlink dedicated control channel 342 and an uplink dedicated control channel 343 every frame. To improve capacity, a mobile station can also use the same downlink dedicated control channel 342 and the same uplink dedicated control channel 343 once per multiple frames periodically.

Reference is now made to FIG. 4. FIG. 4 illustrates an example of a method 400 for efficiently transmitting control information in accordance with the present disclosure. The method 400 may be implemented by a mobile station in order to transmit control information on the uplink.

The method 400 may include spreading 402 data from an uplink dedicated control channel that is assigned to the mobile station. A PN code may be used to spread the data. The PN code that is used may be orthogonal to the PN codes that are used by other mobile stations for spreading other uplink dedicated control channels. The signal that results from spreading the uplink dedicated control channel data in this manner is a CDMA-based signal.

The method 400 may also include allocating 404 a portion of OFDMA uplink frames for transmission of the CDMA-based signal that includes the spread data from the uplink dedicated control channel. The method 400 may also include converting 406 this CDMA-based signal into a format that is suitable for transmission via OFDMA techniques. For example, the CDMA-based signal may be converted from the time domain into the frequency domain by performing a Fast Fourier Transform (FFT) on the CDMA-based signal. The method 400 may also include transmitting 408 the converted CDMA-based signal in an uplink frame using a subset of the available OFDMA subcarriers.

The method 400 of FIG. 4 described above may be performed by various hardware and/or software component(s)

and/or module(s) corresponding to the means-plus-function blocks 500 illustrated in FIG. 5. In other words, blocks 402 through 408 illustrated in FIG. 4 correspond to means-plus-function blocks 502 through 508 illustrated in FIG. 5.

Reference is now made to FIG. 6. FIG. 6 illustrates another example of a method 600 for efficiently transmitting control information in accordance with the present disclosure. The method 600 may be implemented by a base station in order to transmit control information on the downlink.

The method 600 may include spreading 602 data from multiple downlink dedicated control channels that are assigned to multiple mobile stations. A set of orthogonal Walsh codes may be used to spread the data. The signal that results from spreading the downlink dedicated control channel data in this manner is a CDMA-based signal.

The method 600 may also include allocating 604 a portion of OFDMA downlink frames for transmission of the CDMA-based signal that includes the spread data from the downlink dedicated control channels. The method 600 may also include converting 606 this CDMA-based signal into a format that is suitable for transmission via OFDMA techniques. For example, the CDMA-based signal may be converted from the time domain into the frequency domain by performing a Fast Fourier Transform (FFT) on the CDMA-based signal. The method 600 may also include transmitting 608 the converted CDMA-based signal in a downlink frame using a subset of the available OFDMA subcarriers.

The method 600 of FIG. 6 described above may be performed by various hardware and/or software component(s) and/or module(s) corresponding to the means-plus-function blocks 700 illustrated in FIG. 7. In other words, blocks 602 through 608 illustrated in FIG. 6 correspond to means-plus-function blocks 702 through 708 illustrated in FIG. 7.

Reference is now made to FIG. 8. FIG. 8 illustrates examples of signaling messages 844 that may be transmitted over a downlink dedicated control channel 842. The signaling messages 844 may include bandwidth allocation messages 846 to signal how downlink and uplink OFDMA bandwidth is allocated. The signaling messages 844 may also include power control messages 848 to control the transmission power of the corresponding uplink dedicated control channel. Other MAC management messages 850 (e.g., as specified in WiMAX standards) can also be transmitted.

Reference is now made to FIG. 9. FIG. 9 illustrates examples of signaling messages 944 that may be transmitted over an uplink dedicated control channel 943. The signaling messages 944 may include bandwidth request messages 946 to request uplink OFDMA bandwidth. Other MAC management messages 950 (e.g., as specified in WiMAX standards) can also be transmitted on an uplink dedicated control channel 943.

Figure 10:
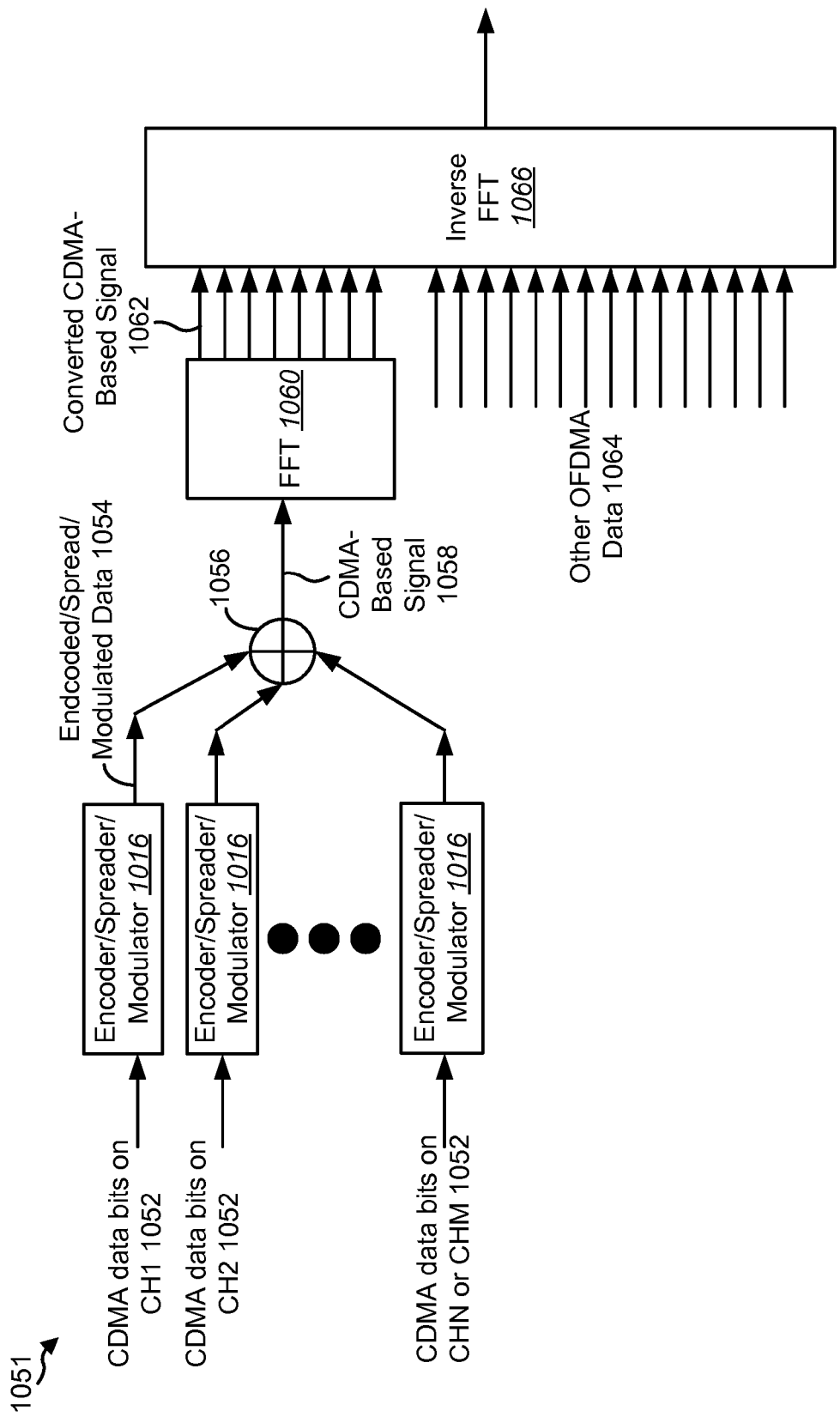
FIG. 10 illustrates an example of a transmitter that may be implemented in a base station or a mobile station.

Reference is now made to FIG. 10. FIG. 10 illustrates an example of a transmitter 1051 that may be implemented in a base station that is configured to transmit CDMA-based dedicated control channels in an OFDMA-based wireless communication network in accordance with the present disclosure. Although the transmitter 1051 will be described as if it is implemented in a base station, a mobile station may include a transmitter that is configured similarly to the transmitter 1051 shown in FIG. 10.

Data 1052 corresponding to various dedicated control channels is shown. The data 1052 for each control channel may be independently encoded, spread and modulated. Multiple encoder/spreader/modulator components 1016 are shown for providing this functionality.

The encoded, spread and modulated data 1054 may then be summed together. An adder 1056 is shown for providing this functionality. This results in a CDMA-based signal 1058. The CDMA-based signal 1058 includes the data 1052 from the various dedicated control channels. The CDMA-based signal 1058 may be thought of as a composite of the various dedicated control channel signals.

The CDMA-based signal 1058 may be converted into a format that is suitable for transmission via OFDMA techniques. For example, a Fast Fourier Transform (FFT) operation may be performed on the CDMA-based signal 1058. An FFT component 1060 is shown for providing this functionality. This results in a converted CDMA-based signal 1062, which may also be thought of as OFDMA data. Both the converted CDMA-based signal 1062 and other OFDMA data 1064 corresponding to the same symbol time duration are shown being provided as input to an inverse FFT component 1066.

A subset of available OFDMA subcarriers may be used to transmit the converted CDMA-based signal 1062 to mobile stations. The remaining OFDMA subcarriers may be used to transmit the other OFDMA data 1064 corresponding to the same symbol time duration.

Figure 11:
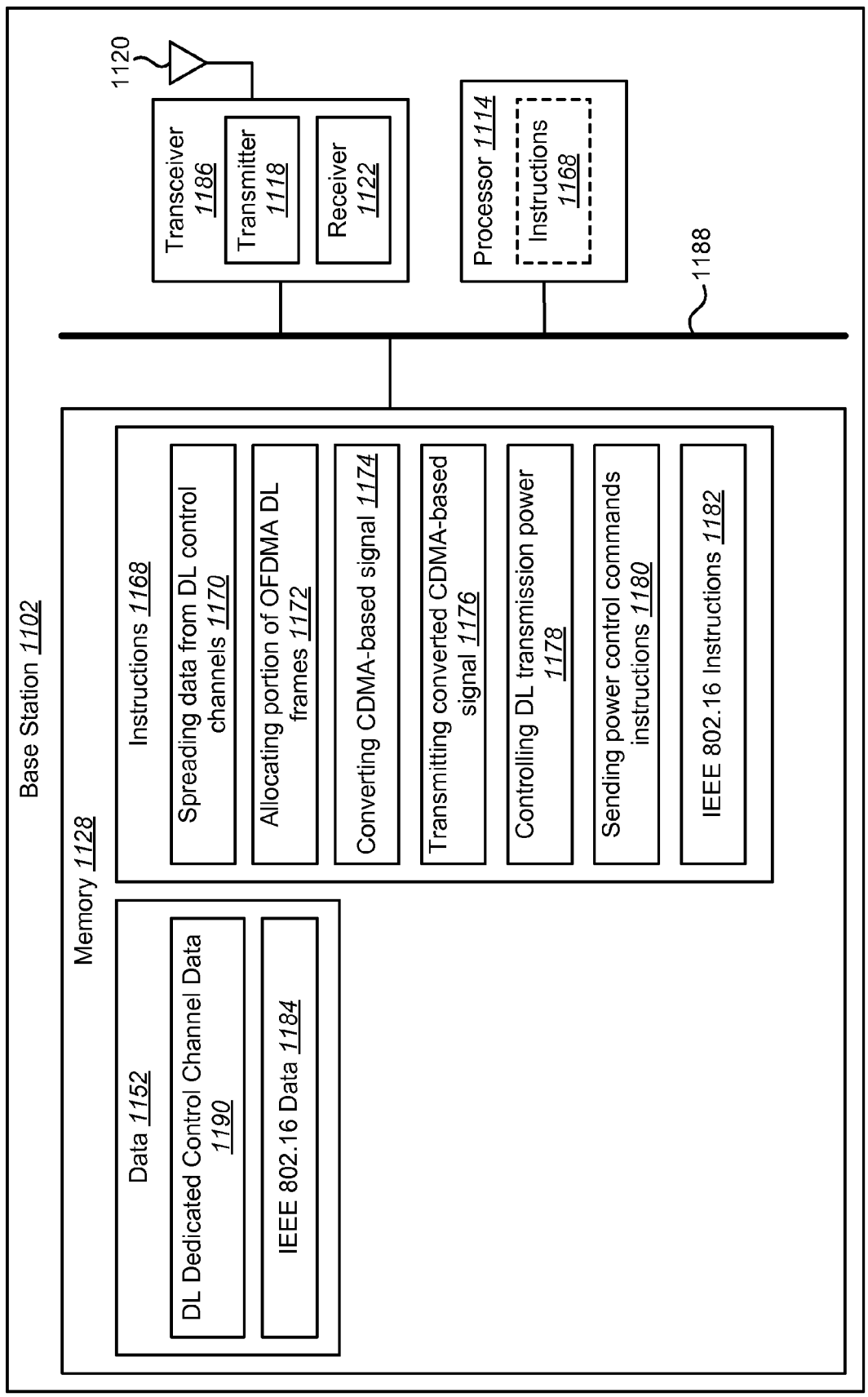
FIG. 11 illustrates certain components that may be included within a base station in accordance with the present disclosure.

Reference is now made to FIG. 11. FIG. 11 illustrates certain components that may be included within a base station 1102 that is configured to transmit CDMA-based dedicated control channels in an OFDMA-based wireless communication network in accordance with the present disclosure.

The base station 1102 includes a processor 1114. The processor 1114 may be a general purpose single- or multi-chip microprocessor (e.g., an ARM), a special purpose microprocessor (e.g., a digital signal processor (DSP)), a microcontroller, a programmable gate array, etc. The processor 1114 may be referred to as a central processing unit (CPU). Although just a single processor 1114 is shown in the base station 1102 of FIG. 11, in an alternative configuration, a combination of processors (e.g., an ARM and DSP) could be used.

The base station 1102 also includes memory 1128. The memory 1128 may be any electronic component capable of storing electronic information. The memory 1128 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1152 and instructions 1168 may be stored in the memory 1128. The instructions 1168 may be executable by the processor 1114 to implement various functions. Executing the instructions 1168 may involve the use of the data 1152 that is stored in the memory 1128.

The base station 1102 may include instructions 1170 for spreading data 1190 from various downlink dedicated control channels to form a CDMA-based signal. A set of orthogonal Walsh codes may be used to spread the data 1190.

The base station 1102 may also include instructions 1172 for allocating a portion of OFDMA downlink frames for transmission of the CDMA-based signal that includes the data 1190 from the downlink dedicated control channels.

The base station 1102 may also include instructions 1174 for converting the CDMA-based signal into a format that is suitable for transmission via OFDMA techniques. For example, the CDMA-based signal may be converted from the time domain into the frequency domain by performing a Fast Fourier Transform (FFT) on the CDMA-based signal.

The base station 1102 may also include instructions 1176 for transmitting the converted CDMA-based signal to mobile stations using a subset of available OFDMA subcarriers. The remaining OFDMA subcarriers may be used to transmit the other OFDMA data corresponding to the same symbol time duration.

The base station 1102 may also include instructions 1178 for controlling the transmission power of the downlink dedicated control channels. The base station 1102 may also include instructions 1180 for sending power control commands to mobile stations via the downlink dedicated control channels. Each mobile station may control the transmission power of its assigned uplink dedicated control channel based on the power control commands that are sent by the base station 1102 through the corresponding downlink dedicated control channel. With power control on the downlink and uplink control channels, power consumption can be optimized and signaling capacity can be increased.

The base station 1102 may be configured to communicate via a wireless communication network that supports the IEEE 802.16 standard (i.e., WiMAX). The base station 1102 may include instructions 1182 and data 1184 that facilitate communication in accordance with the IEEE 802.16 standard.

Other types of instructions 1168 and data 1152 that are relevant to implementing the techniques described herein may also be included in the memory 1128.

The base station 1102 may also include a transmitter 1118 and a receiver 1122 to allow transmission and reception of signals between the base station 1102 and a mobile station. The transmitter 1118 and receiver 1122 may be collectively referred to as a transceiver 1186. An antenna 1120 may be electrically coupled to the transceiver 1186. The base station 1102 may also include (not shown) multiple transmitters, multiple receivers, multiple transceivers and/or multiple antenna.

The various components of the base station 1102 may be coupled together by one or more buses, which may include a power bus, a control signal bus, a status signal bus, a data bus, etc. For the sake of clarity, the various buses are illustrated in FIG. 11 as a bus system 1188.

Figure 12:
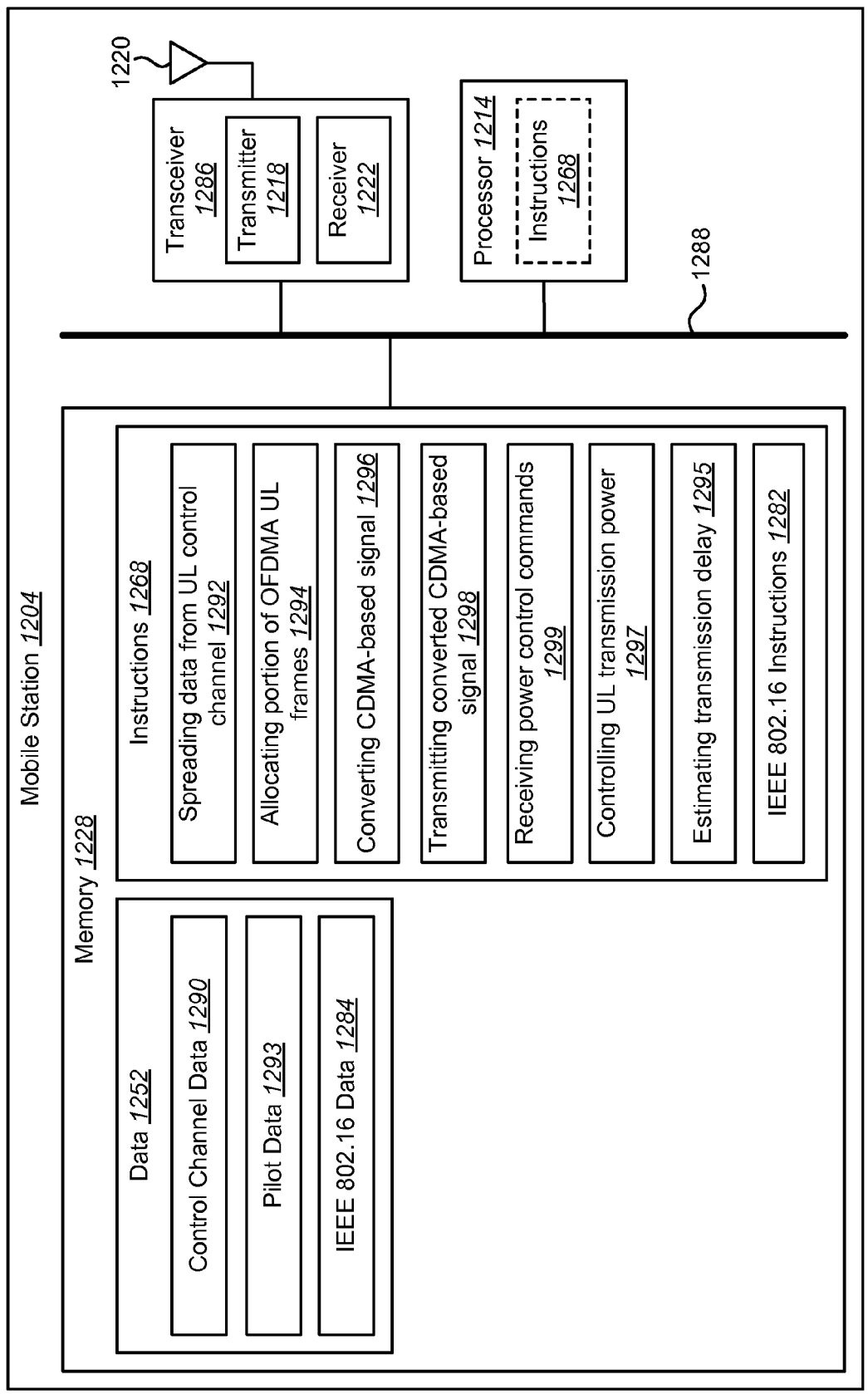
FIG. 12 illustrates certain components that may be included within a mobile station in accordance with the present disclosure.

Reference is now made to FIG. 12. FIG. 12 illustrates certain components that may be included within a mobile station 1204 that is configured to transmit CDMA-based dedicated control channels in an OFDMA-based wireless communication network in accordance with the present disclosure.

The mobile station 1204 includes many components that are similar to the components of the base station 1102 of FIG. 11, including a processor 1214, memory 1228 storing both data 1252 and instructions 1268, a transceiver 1286 including a transmitter 1218 and a receiver 1222, an antenna 1220, and a system bus 1288.

The mobile station 1204 may include instructions 1292 for spreading data 1252 from an uplink dedicated control channel that is assigned to the mobile station 1204 to form a CDMA-based signal. A PN code may be used to spread the data 1252. The PN code that is used may be orthogonal to the PN codes that are used by other mobile stations 1204 for spreading other uplink dedicated control channels.

The mobile station 1204 may also include instructions 1294 for allocating a portion of OFDMA uplink frames for transmission of the CDMA-based signal that includes the data 1290 from the uplink dedicated control channel.

The mobile station 1204 may also include instructions 1296 for converting the CDMA-based signal into a format that is suitable for transmission via OFDMA techniques. For example, the CDMA-based signal may be converted from the time domain into the frequency domain by performing a Fast Fourier Transform (FFT) on the CDMA-based signal.

The mobile station 1204 may also include instructions 1298 for transmitting the converted CDMA-based signal to a base station using a subset of available OFDMA subcarriers. The remaining OFDMA subcarriers may be used to transmit the other OFDMA data corresponding to the same symbol time duration.

The mobile station 1204 may also include instructions 1299 for receiving power control commands. These power control commands may be sent by the base station through the downlink dedicated control channel that is assigned to the mobile station 1204. The mobile station 1204 may include instructions 1297 for controlling the transmission power of its assigned uplink dedicated control channel based on the power control commands that are received. As indicated above, with power control on the downlink and uplink control channels, power consumption can be optimized and signaling capacity can be increased.

The mobile station 1204 may also include instructions 1295 for estimating the transmission delay between the base station and the mobile station 1204. As indicated above, within the downlink frame, the CDMA control channels may begin with a common pilot channel. The pilot data 1293 that is transmitted via the pilot channel can be used to estimate the delay between the base station and the mobile station 1204. This illustrates another potential advantage of the techniques disclosed herein. Using the CDMA pilot 1293 to estimate the delay between the base station and the mobile station 1204 can achieve higher resolution in delay measurement as compared to current WiMAX systems, because the correlation function of the CDMA PN or Walsh code sequence is well-suited for delay estimation.

The mobile station 1204 may be configured to communicate via a wireless communication network that supports the IEEE 802.16 standard (i.e., WiMAX). The mobile station 1204 may include instructions 1282 and data 1284 that facilitate communication in accordance with the IEEE 802.16 standard.

Other types of instructions 1268 and data 1252 that are relevant to implementing the techniques described herein may also be included in the memory 1228.

The techniques disclosed herein may provide certain advantages relative to known approaches. For example, the techniques disclosed herein may be used to reduce the signaling overhead and call processing delay in mobile WiMAX systems. The techniques disclosed herein may have the effect of increasing the VoIP air-link capacity. The techniques disclosed herein may facilitate the measurement of the delay between the base station and the mobile station with higher resolution (e.g., by providing the CDMA pilot).

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent subcarriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure. For example, a reference to "mobile station 1204" refers to the specific mobile station that is shown in FIG. 12. However, the use of "mobile station" without a reference number refers to any mobile station that is appropriate for the context in which the term is used, and is not limited to any particular mobile station shown in the Figures.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements. The terms "instructions" and "code" may be used interchangeably herein.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 4 and 6, can be downloaded and/or otherwise obtained by a mobile station and/or a base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile station and/or a base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for efficiently transmitting control information, the method being implemented by a mobile station, the method comprising:

allocating a portion of orthogonal frequency division multiple access (OFDMA) uplink frames for transmission of a code division multiple access (CDMA) based signal, wherein the CDMA-based signal comprises data from an uplink dedicated control channel that is assigned to the mobile station;

applying a fast Fourier transform (FFT) to the CDMA-based signal to convert the CDMA-based signal into an OFDMA-based signal; and transmitting the CDMA-based signal converted into the OFDMA-based signal to a base station using a subset of available OFDMA subcarriers.

2. The method of claim 1, further comprising spreading the data from the uplink dedicated control channel using a pseudo-noise (PN) code to form the CDMA-based signal.

3. The method of claim 1, further comprising:
receiving power control commands from the base station via a downlink dedicated control channel that is assigned to the mobile station; and
controlling transmission power of the uplink dedicated control channel based on the power control commands.

4. The method of claim 1, wherein the data from the uplink dedicated control channel comprises a bandwidth request message.

5. The method of claim 1, wherein the mobile station is configured for operation in a wireless communication network that supports an Institute of Electronic and Electrical Engineers (IEEE) 802.16 standard.

6. A method for efficiently transmitting control information, the method being implemented by a base station, the method comprising:
allocating a portion of orthogonal frequency division multiple access (OFDMA) downlink frames for transmission of a code division multiple access (CDMA) based signal, wherein the CDMA-based signal comprises data from downlink dedicated control channels that are assigned to various mobile stations;
applying a fast Fourier transform (FFT) to the CDMA-based signal to convert the CDMA-based signal into an OFDMA-based signal; and
transmitting the CDMA-based signal converted into the OFDMA-based signal to the various mobile stations using a subset of available OFDMA subcarriers.

7. The method of claim 6, further comprising spreading the data from the downlink dedicated control channels using a set of orthogonal Walsh codes.

8. The method of claim 6, further comprising:
controlling transmission power of the downlink dedicated control channels; and
sending power control commands to the various mobile stations via the downlink dedicated control channels.

9. The method of claim 6, wherein the data from the downlink dedicated control channels comprises bandwidth allocation messages.

10. The method of claim 6, wherein the base station is configured for operation in a wireless communication network that supports an Institute of Electronic and Electrical Engineers (IEEE) 802.16 standard.

11. A mobile station for efficiently transmitting control information, comprising:
a processor;
memory in electronic communication with the processor;
instructions stored in the memory, the instructions being executable by the processor to:
allocate a portion of orthogonal frequency division multiple access (OFDMA) uplink frames for transmission of a code division multiple access (CDMA) based signal, wherein the CDMA-based signal comprises data from an uplink dedicated control channel that is assigned to the mobile station;
apply a fast Fourier transform (FFT) to the CDMA-based signal to convert the CDMA-based signal into an OFDMA-based signal; and
transmit the CDMA-based signal converted into the OFDMA-based signal to a base station using a subset of available OFDMA subcarriers.

12. The mobile station of claim 11, wherein the instructions are executable to spread the data from the uplink dedicated control channel using a pseudo-noise (PN) code to form the CDMA-based signal.

13. The mobile station of claim 11, wherein the instructions are also executable to:
receive power control commands from the base station via a downlink dedicated control channel that is assigned to the mobile station; and
control transmission power of the uplink dedicated control channel based on the power control commands.

14. The mobile station of claim 11, wherein the data from the uplink dedicated control channel comprises a bandwidth request message.

15. The mobile station of claim 11, wherein the mobile station is configured for operation in a wireless communication network that supports an Institute of Electronic and Electrical Engineers (IEEE) 802.16 standard.

16. A base station for efficiently transmitting control information, comprising:
a processor;
memory in electronic communication with the processor;
instructions stored in the memory, the instructions being executable by the processor to:
allocate a portion of orthogonal frequency division multiple access (OFDMA) downlink frames for transmission of a code division multiple access (CDMA) based signal, wherein the CDMA-based signal comprises data from downlink dedicated control channels that are assigned to various mobile stations;
apply a fast Fourier transform (FFT) to the CDMA-based signal to convert the CDMA-based signal into an OFDMA-based signal; and
transmit the CDMA-based signal converted into the OFDMA-based signal to the various mobile stations using a subset of available OFDMA subcarriers.

17. The base station of claim 16, wherein the instructions are also executable to spread the data from the downlink dedicated control channels using a set of orthogonal Walsh codes.

18. The base station of claim 16, wherein the instructions are also executable to:
control transmission power of the downlink dedicated control channels; and
send power control commands to the various mobile stations via the downlink dedicated control channels.

19. The base station of claim 16, wherein the data from the downlink dedicated control channels comprises bandwidth allocation messages.

20. The base station of claim 16, wherein the base station is configured for operation in a wireless communication network that supports an Institute of Electronic and Electrical Engineers (IEEE) 802.16 standard.

21. A mobile station for efficiently transmitting control information, comprising:
means for allocating a portion of orthogonal frequency division multiple access (OFDMA) uplink frames for transmission of a code division multiple access (CDMA) based signal, wherein the CDMA-based signal comprises data from an uplink dedicated control channel that is assigned to the mobile station;
means for applying a fast Fourier transform (FFT) to the CDMA-based signal to convert the CDMA-based signal into an OFDMA-based signal; and
means for transmitting the CDMA-based signal converted into the OFDMA-based signal to a base station using a subset of available OFDMA subcarriers.

22. The mobile station of claim 21, further comprising:
means for receiving power control commands from the base station via a downlink dedicated control channel that is assigned to the mobile station; and
means for controlling transmission power of the uplink dedicated control channel based on the power control commands.

23. The mobile station of claim 21, wherein the data from the uplink dedicated control channel comprises a bandwidth request message.

24. A base station for efficiently transmitting control information, comprising:
means for allocating a portion of orthogonal frequency division multiple access (OFDMA) downlink frames for transmission of a code division multiple access (CDMA) based signal, wherein the CDMA-based signal comprises data from downlink dedicated control channels that are assigned to various mobile stations;
means for applying a fast Fourier transform (FFT) to the CDMA-based signal to convert the CDMA-based signal into an OFDMA-based signal; and
means for transmitting the CDMA-based signal converted into the OFDMA-based signal to the various mobile stations using a subset of available OFDMA subcarriers.

25. The mobile station of claim 24, further comprising:
means for controlling transmission power of the downlink dedicated control channels; and
means for sending power control commands to the various mobile stations via the downlink dedicated control channels.

26. The mobile station of claim 24, wherein the data from the downlink dedicated control channels comprises bandwidth allocation messages.

27. A non-transitory computer-readable medium having a computer-program product for efficiently transmitting control information, the computer-readable medium having instructions thereon, the instructions comprising:
code for allocating a portion of orthogonal frequency division multiple access (OFDMA) uplink frames for transmission of a code division multiple access (CDMA) based signal, wherein the CDMA-based signal comprises data from an uplink dedicated control channel that is assigned to a mobile station;
code for applying a fast Fourier transform (FFT) to the CDMA-based signal to convert the CDMA-based signal into an OFDMA-based signal; and
code for transmitting the CDMA-based signal converted into the OFDMA-based signal to a base station using a subset of available OFDMA subcarriers.

28. The non-transitory computer-readable medium of claim 27, wherein the instructions further comprise:
code for receiving power control commands from the base station via a downlink dedicated control channel that is assigned to the mobile station; and
code for controlling transmission power of the uplink dedicated control channel based on the power control commands.

29. The non-transitory computer-readable medium of claim 27, wherein the data from the uplink dedicated control channel comprises a bandwidth request message.

30. A non-transitory computer-readable medium having a computer-program product for efficiently transmitting control information, the computer-readable medium having instructions thereon, the instructions comprising:
code for allocating a portion of orthogonal frequency division multiple access (OFDMA) downlink frames for transmission of a code division multiple access (CDMA) based signal, wherein the CDMA-based signal comprises data from downlink dedicated control channels that are assigned to various mobile stations;
code for applying a fast Fourier transform (FFT) to the CDMA-based signal to convert the CDMA-based signal into an OFDMA-based signal; and
code for transmitting the CDMA-based signal converted into the OFDMA-based signal to the various mobile stations using a subset of available OFDMA subcarriers.

31. The non-transitory computer-readable medium of claim 30, wherein the instructions further comprise:
code for controlling transmission power of the downlink dedicated control channels; and
code for sending power control commands to the various mobile stations via the downlink dedicated control channels.

32. The non-transitory computer-readable medium of claim 30, wherein the data from the downlink dedicated control channels comprises bandwidth allocation messages.

* * * * *